United States Patent
Kurtz et al.

(10) Patent No.: US 7,716,964 B2
(45) Date of Patent: May 18, 2010

(54) LEAK DETECTOR FOR A PRESSURIZED CYLINDER

(75) Inventors: Anthony D. Kurtz, Saddle River, NJ (US); Joseph Van DeWeert, Maywood, NJ (US); Richard J. Martin, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 671 days.

(21) Appl. No.: 11/650,686

(22) Filed: Jan. 8, 2007

(65) Prior Publication Data

US 2008/0163668 A1    Jul. 10, 2008

(51) Int. Cl.
*G01M 3/26* (2006.01)
*G01M 3/34* (2006.01)
(52) U.S. Cl. ............... 73/11.04; 73/40; 73/49.3
(58) Field of Classification Search ........ 73/11.04, 73/40, 49.3
See application file for complete search history.

(56) References Cited

U.S. PATENT DOCUMENTS

| 4,766,763 A | 8/1988 | Kurtz |
| 5,428,985 A | 7/1995 | Kurtz |
| 5,569,841 A * | 10/1996 | Hoban et al. .......... 73/47 |

* cited by examiner

*Primary Examiner*—Daniel S Larkin
(74) *Attorney, Agent, or Firm*—Troutman Sanders, LLP; James E. Schutz

(57) ABSTRACT

A leak detector apparatus for a pressurized cylinder having a cylinder of a radius (r) with a slidable piston in the cylinder with a gas filled chamber positioned between a cylinder end and the piston face. The length (L) of the chamber is calculated according to load changes on the piston where the volume ($V_c$) of the chamber changes. The pressure and temperature of the chamber are measured as well as the length. These values are inputted to a processor to solve the ideal gas law equation PV=nRT where a change in n for a change in length indicates a leak.

20 Claims, 3 Drawing Sheets

LEAK DETECTOR FOR A PRESSURIZED CYLINDER

FIELD OF THE INVENTION

This invention relates to the detection of fluid leaks in a container and more particularly to detection of a fluid leak in a pressurized cylinder.

BACKGROUND OF THE INVENTION

Measuring the leak rate of a fluid in a sealed container is a very important procedure in many different applications. One can measure the leak rate in a pressurized gas bottle to determine whether or not the bottle exhibits a leak after a pressurized gas is placed in the bottle. As one can ascertain, for a fixed volume container one can measure the leak rate by measuring the pressure and temperature inside the container. By using the ideal gas law, which is $PV=nRT$ (or for higher pressure the Van der Waals equation), it is easy to see that taking the ratio of pressure to temperature $P/T$ gives a measure of the molar density $(n/V)$ which only changes with a leak in the system. This is a well known principle and the assignee herein, namely Kulite Semiconductor Products, Inc. has a number of patents and pending applications concerning the use of the above-noted gas law to determine leaks in a container. See for example U.S. Pat. No. 5,428,985 entitled "Gas Leak Detection Apparatus and Methods" issued on Jul. 4, 1995 to A. D. Kurtz et al and assigned to the assignee herein. See also U.S. Pat. No. 4,766,763 entitled "Gas Leak Detection Apparatus and Methods" issued on Aug. 30, 1988 to A. D. Kurtz the inventor herein, and also assigned to the assignee herein. The above-noted patents basically use a pressure transducer which produces an output voltage proportional to the gas pressure inside a container or a vessel to be monitored. The above-noted patents employ amplifier circuits and operate on the principle of the ideal gas law which states that at normal temperatures and pressures the pressure of a gas is given by the equation $PV=nRT$, where V is volume occupied by the gas, P is the pressure of the gas, R is the universal gas constant, n is the number of moles of gas within the volume, and T is the absolute temperature of the gas. The output of the apparatus is proportional to the ratio of pressure to temperature, namely $P/T$ and accordingly is independent of temperature induced pressure changes. Thus for a fixed volume a change in the value of the output signal would be indicative of the change in the number of moles of gas contained in the vessel, thereby denoting or determining a leak condition of the container. The pressure transducers may employ deflectable diaphragms which operate in conjunction with piezoresistors which typically are arranged in a Wheatstone bridge array. Such pressure transducers are well known, and Kulite Semiconductor Products, Inc., the assignee herein, has many patents which involve fabrication and implementation of pressure transducers including those capable of operating at high pressures in high temperature environments. In regard to the above, a much more complicated situation occurs when the volume (V) of the container changes over time. In general, to measure a gas leak in this case the volume must also be measured. One specific application which can create major problems is the detection of leaks in a shock absorber, such as those used in aircraft or in automobiles. While a leak in an automobile shock absorber is typically not a life threatening event, a leak in a shock absorber or a landing gear of an airplane can be catastrophic and should be quickly identified.

There is disclosed apparatus and a method for measuring leaks in an aircraft shock absorber or other similar device by measuring the pressure, temperature and displacement.

SUMMARY OF THE INVENTION

Apparatus for measuring a leak in a pressurized cylindrical container having a gas chamber and having a radius r where the length of the container changes with an applied load, comprising: a pressure sensor coupled to the container and positioned to measure the pressure (P) in the chamber, a temperature sensor coupled to the container and positioned to measure the temperature (T) of the container, a displacement sensor coupled to the container for measuring the length (L) of the container during different applied load conditions, processing means coupled to the sensors to provide an output indicative of the volume of the container according to the $V_c=\pi r^2 L$ where:
  $V_c$=volume of the container
  $\pi$=Pi (or approximately 3.14)
  r=radius of the cylinder
  L=length of the container and the processing means providing an output according to $PV=nRT$ where:
  P=the pressure in the container
  V=the volume of the container
  n=the number of moles of gas in the container
  R=universal gas constant
  T=absolute temperature of the container whereby the number of moles of gas is determined during different load conditions and where L changes and whereby a leak is detected if the number of moles decreases from one load condition to another.

DETAILED DESCRIPTION OF THE INVENTION

Figure 1:
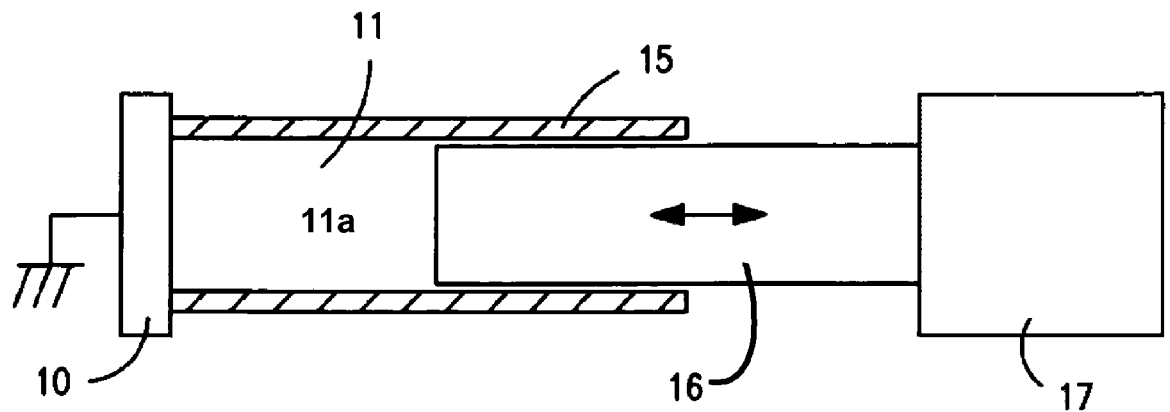
FIG. 1 is a cross-sectional view of a pressurized cylinder which is utilized as a basic shock absorber.

Referring to FIG. 1, there is shown a pressurized cylinder such as those employed in an aircraft shock absorber or an aircraft landing gear in which the displacement or length changes during normal operation. As seen in FIG. 1 there is fixed end or base 10 which basically is associated with a cylindrical member 15. Positioned within the cylindrical member 15, is a piston 16 which moves slidably in the direction of the arrows depicted. The piston 16 is associated with a mass 17 which may be a damped mass and may be coupled to the wheel or tire of an aircraft or an automobile when employed as a shock absorber. There is a gas or fluid 11a located in the cavity 11 formed between the piston face and cylinder wall. The gas in the cavity compresses or expands depending on the position of the piston in the cylinder 15. If the mechanism shown in FIG. 1 is employed as a landing gear or a shock absorber for an aircraft, when the aircraft is on the ground a great weight is applied to the apparatus which causes the piston 16 to move towards the left thus compressing the gas within the gas cavity or chamber 11. In any event, while the gas is compressed, the number of molecules of gas or moles of the gas does not change. This would not change unless there is a leak. The present invention relates to a method for measuring leaks by measuring the displacement of the cylinder during multiple load conditions and therefore determining whether or not a leak exists.

Figure 2:
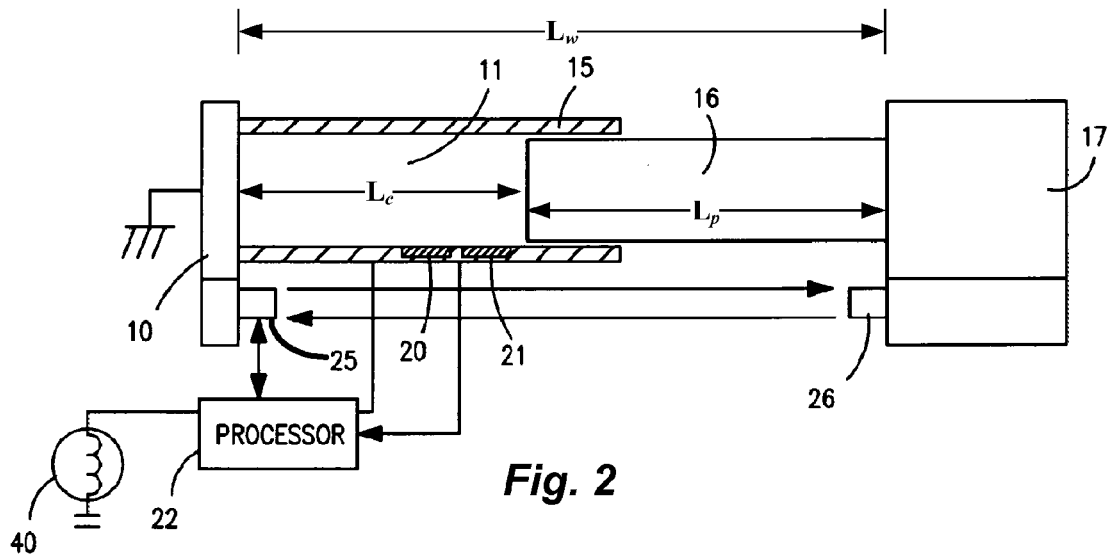
FIG. 2 is a schematic of the shock absorber of FIG. 1 including apparatus for detecting a leak according to an aspect of the invention.

Referring to FIG. 2, there is shown, the basic shock absorber configuration depicted in FIG. 1 in an extended position. This extended position for example would be analogous to the aircraft being off the ground or flying above the ground whereby the weight impressed on the wheels would be eliminated once the aircraft is off the ground. In any event, FIG. 2 depicts the apparatus according to an embodiment of the invention to determine whether or not there is a leak. As shown in FIG. 2, the same numerals have been utilized to depict the same parts as shown in FIG. 1. Thus, numeral 10 represents the fixed end of the cylinder 15 with numeral 16 representing the piston and 11 representing the gas cavity or chamber. One will immediately note that the length $L_c$ of the gas chamber 11 in FIG. 2 is longer than the length of the gas chamber 11 in FIG. 1. In any event, as shown in FIG. 2, there is a temperature sensor 20 such as an RTD or thermistor, for example, embedded in the wall of the cylinder 15 and which temperature sensor measures the absolute temperature $T_c$ within the gas chamber 11. A pressure sensor or pressure transducer 21 is also located within the cavity 11 to measure pressure $P_c$. The pressure transducer 21 may also be embedded or otherwise positioned in the wall of the cylinder and operates to measure the pressure of the gas in the chamber 11. As one can see, the output of the temperature sensor as well as the output of the pressure transducer is inputted to a processor 22. Processor 22 may be a microprocessor or a digital signal processor which would operate to utilize the values of the pressure and temperature to solve the equation indicative of the gas law.

Also depicted in FIG. 2 is a transmitting transducer 25. The transducer 25 may be of the type of transducers as typically found in cameras for determining the focal length of an object to be photographed. Such transducers may be ultrasonic transducers or may incorporate laser devices. In any event, it is an object of the transducer to measure the length $L_w$ which is the length between the fixed end 10 and the mass 17. This length $L_w$ changes during the conditions when the aircraft is on ground as compared to the conditions when the aircraft is in air. Since the length of the piston $L_p$ is known, the length of the cavity $L_c$ is equal to $L_w - L_p$. As shown in FIG. 1, when the aircraft is on ground the length $L_c$ as depicted in FIG. 1 is less than the length $L_c$ as depicted in FIG. 2. The volume $V_c$ of the chamber is equal to, $V_c = \pi r^2 L_c$, the radius r of the cylinder is fixed as is $\pi$. $L_c$ varies. The processor 22 receives a signal proportional to the length $L_c$ where it calculates the volume of the cylinder according to the above-noted equation. It is of course understood that the radius of the cylinder never changes while the length changes and therefore the volume of the cylinder changes. In any event, according to the above-noted equation, even though the volume changes, the pressure also changes as well as the temperature. The processor 22 receives signals indicative of pressure, volume and temperature. The universal gas constant R is of course known and therefore the number of moles of gas can be determined for any cavity length. Once the number of moles is determined, one can ascertain whether there is a leak or no leak, and therefore the processor 22 while solving the ideal gas equation, the processor may indicate the leak by providing an alarm as noted in FIG. 2 by lamp 40. While the alarm lamp 40 is shown it is of course understood that any alarm including a siren, a buzzer or any other alarm can be employed. It is also understood that measurement of the pressure and temperature inside a cylinder is well known and has been done for many years. A combination pressure, temperature sensor can be installed inside the end of the cylinder or can be tapped into the fill line. The processing electronics associated with the measurements for calculation of the ideal gas law equation can be implemented directly on the transducer or employed as a separate device. This can be part of the aircraft itself in the sense that the indicator lamp 40 can be on the dashboard or on the console of the aircraft. In any event, the entire apparatus can also be employed as a hand held device which can be attached to the system during normal maintenance. Such a device will use these measurements to determine the amount of gas present and therefore determine whether or not there is a leak. In prior art techniques, the determination of a leak would require that one bring the piston 16 to full extension so that the system was at a known volume for each measurement. This required removing the mass 17 from the piston or in some other way supporting that mass, which was often difficult and time consuming. In the present invention the leak can be measured much quicker and easier.

Figure 3:
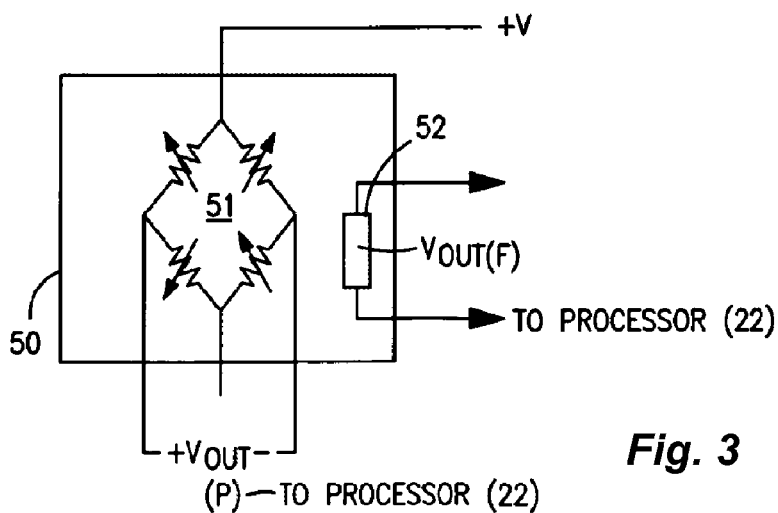
FIG. 3 is a schematic view of an integrated circuit or other apparatus which incorporates a pressure sensor and a temperature sensor employed in this invention.

Referring to FIG. 3, there is shown an integrated circuit 50 which contains a piezoresistive or Wheatstone bridge array 51 which includes four resistors, some or all of which will vary resistance with a pressure or force applied to the diaphragm to produce a voltage output designated as $V_{out}$. $V_{out}$ is proportional to the pressure of the gas in the cavity. Also shown, mounted on the same substrate is a temperature device 52 which may be a thermistor or a RTD device. It is seen that both the output of the pressure sensor as well as the output of the temperature sensor are both directed to the processor 22. The processor 22 may be a microprocessor or may be a special digital circuit adapted to solve the equation determined by the ideal gas law. Displacement transducer 25 or 26 (FIG. 2) can be placed on the wall 10 and sends a signal which is reflected back to the transducer 25 or 26. The transducer 25 computes the length $L_w$ by measuring the return time of the signal. This is well known. While the displacement transducer 25 is shown mounted outside the cylinder, it can also be mounted inside the cylinder as the inner surface of wall 10 and reflect off the piston face to determine $L_c$ directly (See FIG. 5). It is understood that one or both of transducers 25, 26 may be implemented as either a combined Tx/Rx device or as a pair of devices, one being a Tx device and the other an Rx device, for example.

Figure 4:
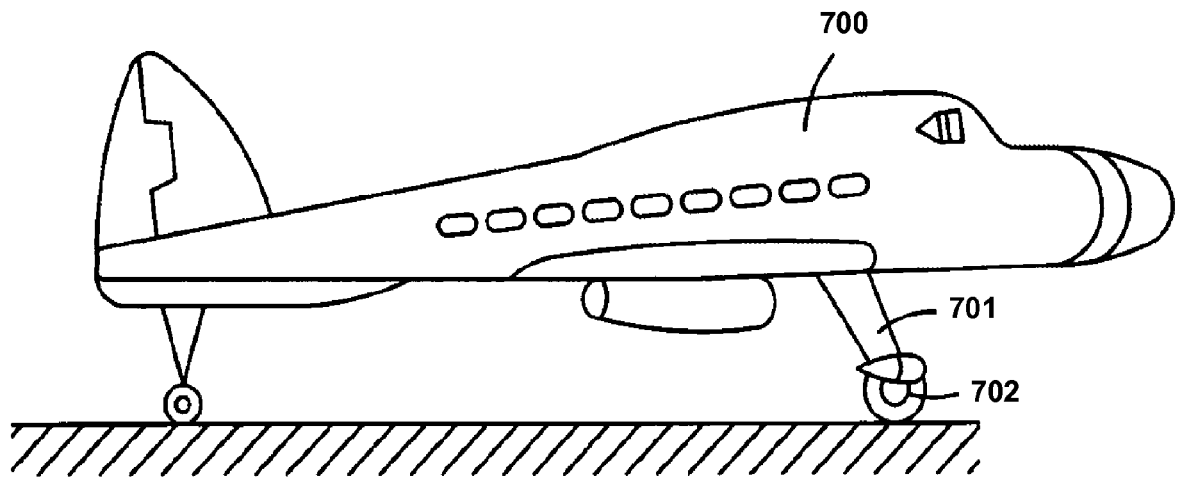
FIG. 4 is a side-elevational view of an aircraft employing a leak detection system according to an aspect of the present invention.

Referring to FIG. 4, there is shown an aircraft 700 having a landing gear 701 which landing gear basically is the piston arrangement shown in FIGS. 1 and 2. The mass 17 (FIG. 1) may include the tire 702 associated with the aircraft landing gear. Thus, one can measure the volume of the landing gear when the aircraft is loaded with a first mass (no passengers) and then measure the volume when the aircraft is loaded with a different mass (passengers). In this manner, one can determine the change in volume due to the change in length and one can also determine whether or not a leak takes place. When the aircraft is in the air, one can also measure the volume as well as pressure and temperature of the landing gear immediately after take-off or within some predetermined time before the aircraft reaches a high altitude and again therefore one can measure the moles of gas and determine whether or not there is a leak. Thus, there is described a technique for measuring the leak rate of a sealed container such as a gas in a pressurized vessel where the volume of the vessel or container changes over time and according to an impressed load.

Figure 5:
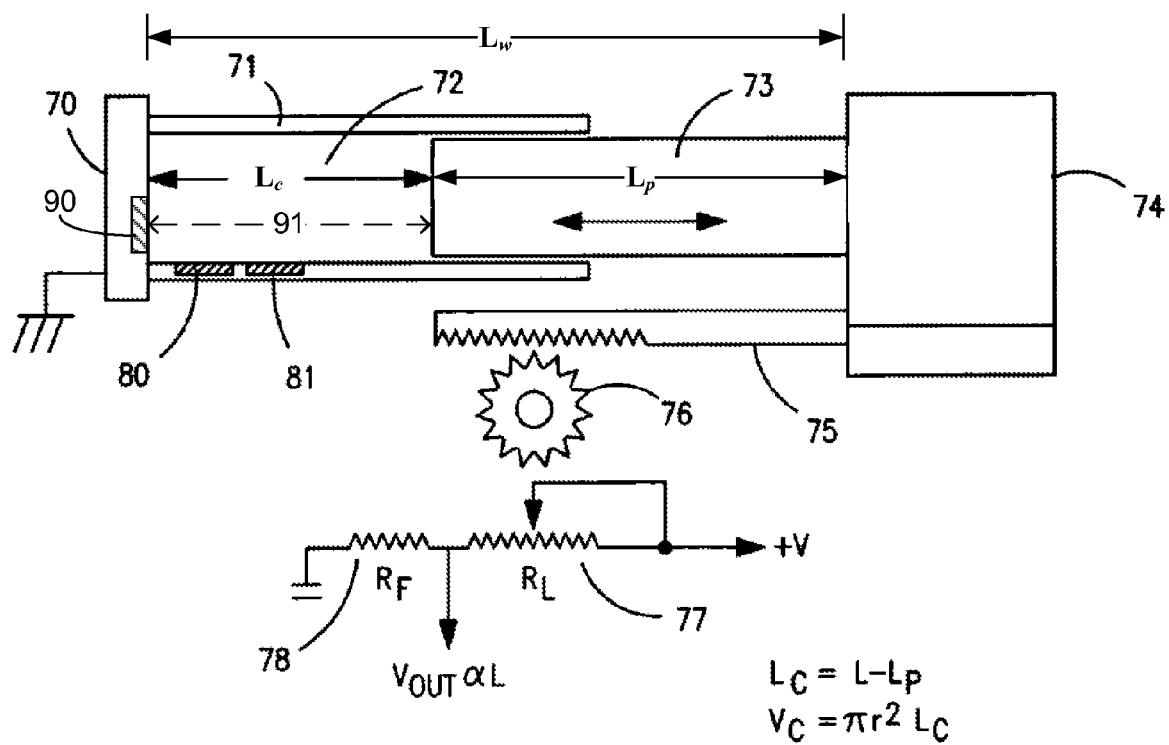
FIG. 5 is a side cross-sectional view of a leak detection apparatus according to an alternate embodiment of the present invention.

Referring to FIG. 5, there is shown a basic shock absorber as for example depicted in FIGS. 1 and 2. In FIG. 5 there is shown a mechanical means of measuring the displacement or the length of the leak detector apparatus. There is shown the fixed end 70 of the cylinder 71 which cylinder 71 is associated with the moveable piston 73 having attached thereto the mass 74. Also shown is the pressure transducer or pressure sensor 80 as well as the temperature sensor 81. Both are shown placed in the wall of the cylinder so that the pressure and temperature of the chamber 72 which contains the gas or fluid is measured. As seen in FIG. 5 there is a ratchet arm 75 attached to the mass 74 of the piston. The ratchet arm coacts with a gear 76 which is coupled to the shaft of a potentiometer designated schematically as 77. Potentiometer 77 is in series with a fixed resistor 78. A voltage is applied to one terminal of resistor 77 while the other terminal of resistor 78 is coupled to a point of reference potential. The junction between the two resistors 77 and 78 is the output voltage which is directly proportional to length. As one can see, the length of the unit L varies because of the fact that the piston moves as described above in the direction of the arrow as depicted. The length of the piston designated as $L_p$ is fixed, while L varies and therefore the length of the chamber which is $L_c$ also varies. As one can immediately ascertain, the length of the chamber $L_c$ is equal to the total length of the apparatus L minus the length of the piston which is $L_p$. The volume of the chamber is as indicated in FIG. 5 as $V_c = \pi r^2 L_c$. It is of course understood that $\pi r^2$ is a fixed number and hence can be stored as a fixed number in the processor memory and when multiplied by $L_c$ gives the volume. As one will understand the computation of the volume enables one to now compute $P_c V_c$ and therefore determine the number of moles in the chamber $L_c$ during a first length and thereafter determine the number of moles during a second length while also measuring temperature. If the number of moles is equal, then there is no leak. If the number of moles differs, then there is a leak and an alarm is sounded. In FIG. 5, of course there is shown a simple way of mechanically measuring the displacement or length of the cylinder and piston associated with the shock absorber according to this invention. FIG. 5 also shows a displacement transducer 90 placed on the inner wall of fixed cylinder end 70. The transducer 90 emits a signal 91 which signal impinges off the piston face and is returned to the transducer 90 which computes $L_c$ directly. Such displacement transducers as transducer 90 are used in cameras and other devices to measure focal length or length and may be ultrasonic, laser or other devices.

Figure 6:
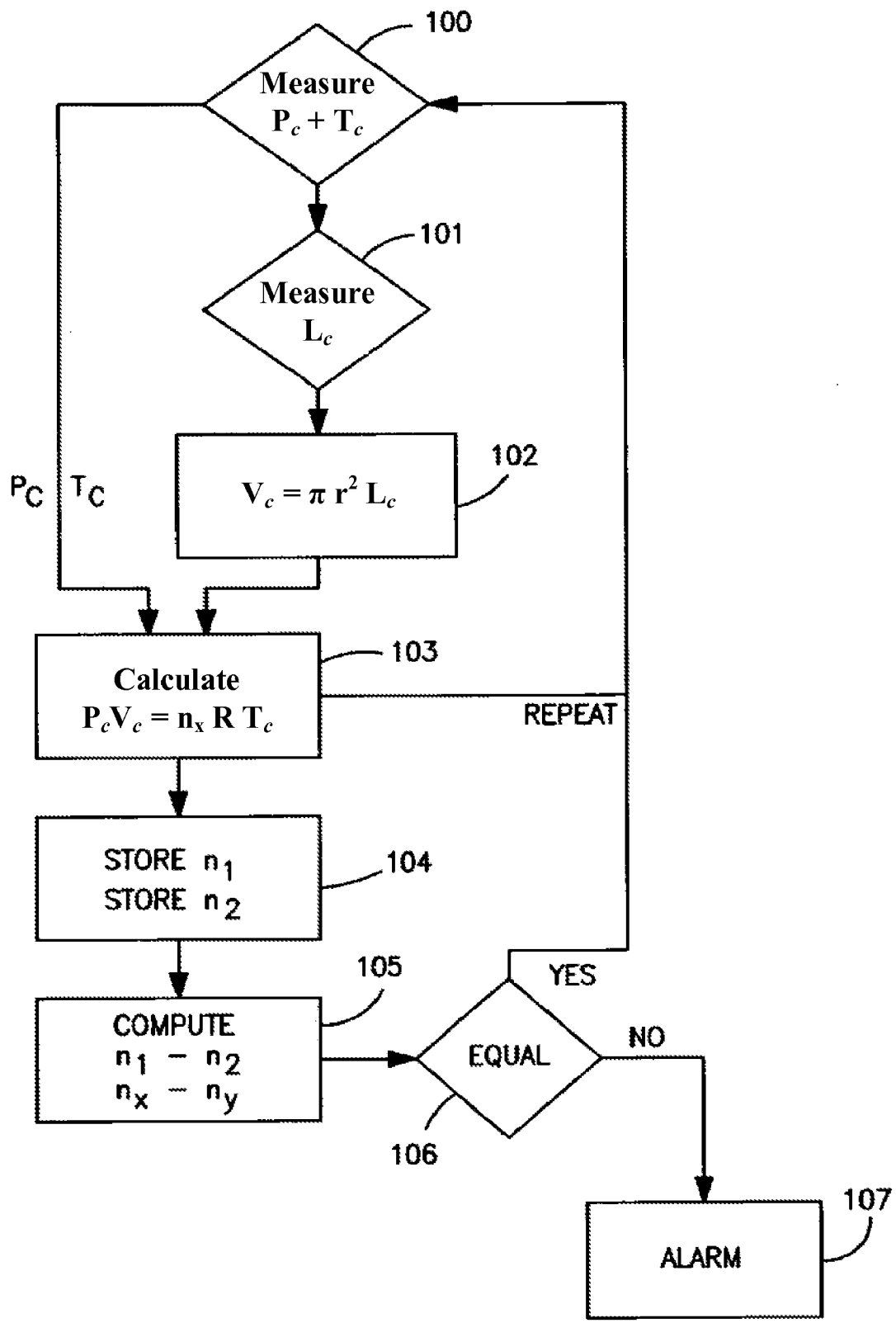
FIG. 6 is a flow chart depicting a method according to an aspect of the present invention.

FIG. 6 is a flow diagram depicting the measurements made by this method. All such measurements, as one will understand are simply implemented by processors as the steps involve multiplication, division and addition and subtraction. All of which are conventionally performed by conventional processors or computing apparatus. Thus referring to FIG. 6, the first step 100 is to measure both the pressure and temperature within the chamber. Once pressure and temperature are measured, one can also measure as depicted by module 101 the length of the chamber. As indicated, the length of the chamber will vary depending upon the load applied to the shock absorber or landing gear. Once the length is measured one can compute the volume as indicated by module 102. While module 102 shows a separate step in computing the volume of the chamber, it is understood that the length of the chamber can be directly inputted to a microprocessor where the microprocessor would compute the volume. As previously indicated $\pi r^2$ is basically a constant as the radius of the cylinder remains constant. As seen in FIG. 6, pressure, temperature and the volume of the chamber are provided and one calculates the number of moles from the ideal gas equation in module 103. The number of moles is equal to $n_x$, thus as seen in step 103, one calculates $P_c V_c = n_x R T_c$. One now stores the value of n1 (one load) and also stores the value n2 (second load), the value of n1 and n2 are indicative of the values of the number of moles in the chamber. These values are based on the measurement of different lengths, as for example when different loads are applied the absorber. In module 104 one can store numerous values of n as calculated for different lengths. As depicted in module 105 one now computes the difference between n1 and n2 or the difference between $n_x$ and $n_y$. These differences are computed automatically. As indicated, there should be no difference in the number of moles even though the length of the chamber will vary based on applied loads. Therefore the number of moles should stay constant and therefore n1−n2 should equal zero. This is indicated by referring to module 106. If n1 is equal to n2 then the process is repeated and the measurements continue. If n1 is not equal to n2 then there is an alarm condition as indicated by module 107 and therefore an alarm will be specified and directly sent to the maintenance people or to the operator of the aircraft.

It is understood that one skilled in the art will find many alternate embodiments which are all deemed to be incorporated with the spirit and scope of the claims appended hereto. It is especially understood that this invention while being related to shock absorbers as employed in aircraft or other vehicles, may also be used to determine the moles of gas in any pressurized vessel whereby the volume of the vessel changes with time or otherwise.

What is claimed is:

1. Apparatus for measuring a leak in a pressurized cylindrical container having a gas chamber where the length of said container and chamber changes with an applied load, comprising:

a pressure sensor coupled to said container and positioned to measure the pressure (P) in said chamber, a temperature sensor coupled to said container and positioned to measure the temperature (T) of said container, a displacement sensor coupled to said container for measuring length changes of the container and chamber during different applied load conditions, and processing means coupled to said sensors to provide an output indicative of the volume of the chamber according to $V_c = \pi r^2 L_c$ where $V_c$ is the volume of the chamber;

r is the radius of the chamber;

$L_c$ is the length of the chamber;

wherein said processing means providing an output according to the equation PV = nRT where:

P is the pressure in the chamber;

V is the volume of the chamber;

n is the number of moles of gas the chamber;

R is the universal gas constant;

T is the absolute temperature of the chamber;

wherein the number of moles of gas is determined during different load conditions where $L_c$ changes and wherein a leak is detected if said number of moles changes from one load condition to another.

2. The apparatus according to claim 1, wherein said cylindrical container is a shock absorber container having a cylinder and a piston positioned in said cylinder to slidably move therein, the gas chamber disposed between a face of the piston and an end of the cylinder which chamber length varies according to a load applied to said piston.

3. The apparatus according to claim 2, wherein said displacement sensor transmits a signal from a first end of said cylinder to an end of said piston to provide an output signal indicative of the length ($L_c$) of said chamber between said cylinder and piston ends which length varies according to said applied load.

4. The apparatus according to claim 1, wherein said pressure sensor is a piezoresistive sensor array.

5. The apparatus according to claim 4, wherein said array is a Wheatstone bridge array.

6. The apparatus according to claim 1, wherein said temperature sensor is a thermistor.

7. The apparatus according to claim 1, wherein said temperature sensor is an RTD.

8. The apparatus according to claim 1, wherein said processing means is a microprocessor.

9. The apparatus according to claim 1, wherein said pressure and temperature sensor are positioned on a single substrate.

10. A method of detecting a gas leak in a pressurized cylinder apparatus, said apparatus having a cylinder, with a piston slideably positioned in said cylinder, with a gas chamber formed between an inner end wall of said cylinder and a face of said piston, the length ($L_c$) of said chamber changing due to an applied load comprising the steps of:
   measuring the pressure P in said chamber,
   measuring the temperature T in said chamber,
   determining the length ($L_c$) of said chamber under an applied load,
   calculating the volume ($V_c$) of said chamber according to the equation $V_c = \pi r^2 L_c$;
   where:
      r is the radius of said chamber;
   computing $PV_c = nRT$ where
      P is the pressure in said chamber;
      T is the temperature of said chamber;
      $V_c$ is the volume of said chamber;
      n is the number of moles of gas in said chamber;
      R is the universal gas constant; and
   determining a difference in the value of n between a first length and a second length of the chamber, wherein a difference is indicative of a gas leak in said chamber.

11. The method according to claim 10, wherein the step of measuring the length $L_c$ comprises the steps of:
   transmitting a signal from one end of said cylinder to one end of said piston, and
   detecting a return signal to calculate $L_c$.

12. The method according to claim 11, wherein said step of transmitting includes transmitting an ultrasonic signal.

13. The method according to claim 10, wherein said pressurized cylinder apparatus is a shock absorber.

14. The method according to claim 13, wherein said shock absorber is an aircraft shock absorber placed in an aircraft landing gear.

15. The method according to claim 10, wherein the step of measuring the pressure in said cylinder includes the step of placing a pressure sensor in said chamber to provide an output signal proportional to pressure.

16. The method according to claim 15, wherein the step of placing a sensor includes placing a piezoresistive sensor in said chamber.

17. The method according to claim 15, wherein the step of placing a pressure sensor includes placing a piezoresistive pressure sensor configured in a Wheatstone bridge array in said chamber.

18. The method according to claim 10, wherein the step of measuring the temperature includes placing a thermistor in said chamber.

19. The method according to claim 10, wherein the step of computing and the step of calculating are implemented by using a microprocessor and applying said measured temperature (T), pressure (P) and container volume ($V_c$) to said microprocessor.

20. The method according to claim 10 further including the step of placing said pressure sensor and said temperature sensor on a common substrate.

* * * * *